(12) United States Patent  
Johnson

(10) Patent No.: US 9,005,401 B2  
(45) Date of Patent: Apr. 14, 2015

(54) ULTRASONIC MICROWAVE MOLECULAR VACUUM DISTILLATION SYSTEM FOR WASTE TIRES

(75) Inventor: James C. Johnson, Longwood, FL (US)

(73) Assignee: Infinite Earth, Inc., Longwood, FL (US)

( * ) Notice: Subject to any disclaimer, the term of this patent is extended or adjusted under 35 U.S.C. 154(b) by 695 days.

(21) Appl. No.: 12/658,883

(22) Filed: Feb. 17, 2010

(65) Prior Publication Data

US 2011/0198207 A1    Aug. 18, 2011

(51) Int. Cl.
*C10B 53/07* (2006.01)
*C10B 19/00* (2006.01)
*C10B 23/00* (2006.01)
*C10G 1/10* (2006.01)

(52) U.S. Cl.
CPC . *C10G 1/10* (2013.01); *C10B 19/00* (2013.01); *C10B 53/07* (2013.01)

(58) Field of Classification Search
CPC ........... C10B 19/00; C10B 53/07; C10G 1/10
USPC ............ 201/19, 25, 41; 202/96, 99, 105, 117, 202/150; 219/700, 701; 423/449.7; 585/241
See application file for complete search history.

(56) References Cited

U.S. PATENT DOCUMENTS

| | | | | |
|---|---|---|---|---|
| 3,997,388 A * | 12/1976 | Simon | ........................ | 159/47.1 |
| 4,118,282 A * | 10/1978 | Wallace | ........................ | 201/2.5 |
| 4,839,151 A * | 6/1989 | Apffel | ........................ | 423/449.7 |
| 5,330,623 A * | 7/1994 | Holland | ........................ | 201/19 |
| 7,101,464 B1 * | 9/2006 | Pringle | ........................ | 202/113 |
| 7,375,255 B2 * | 5/2008 | Lee | ........................ | 585/241 |
| 7,767,187 B2 * | 8/2010 | Hong | ........................ | 423/461 |
| 7,922,870 B2 * | 4/2011 | Kolev et al. | ........................ | 201/25 |

* cited by examiner

*Primary Examiner* — Jill Warden  
*Assistant Examiner* — Joye L Woodard  
(74) *Attorney, Agent, or Firm* — Terry M. Sanks, Esq.; Beusse Wolter Sanks & Maire, P.A.

(57) ABSTRACT

A system for tire distillation including an upper chamber, a first conveyor configured to transport a tire through the upper chamber, a lower chamber located beneath the upper chamber, the lower chamber that includes an ultrasonic purge chamber configured to radiate the tire with ultrasonic radiation, a microwave radiation chamber configured to radiate the tire with microwave radiation, and a second conveyor configured to transport the tire from the ultrasonic purge chamber to the microwave radiation chamber. The system further includes a vacuum system configured to maintain an atmosphere in the ultrasonic purge chamber and the microwave radiation chamber under a vacuum wherein the tire is preheated during conveyance through the upper chamber from heat produced in the lower chamber.

13 Claims, 5 Drawing Sheets

Ultrasonic Microwave Molecular Distillation System for Waste Tires

Ultrasonic Microwave Molecular Distillation System for Waste Tires

Steam Activation Processing Chamber

Pre-Heat Chamber Cross Section

ULTRASONIC MICROWAVE MOLECULAR VACUUM DISTILLATION SYSTEM FOR WASTE TIRES

BACKGROUND

Machines used to recycle tires typically burn the tire to create energy. This burning of the tire is done with cement kilns and other forms of pyrolysis. There are some forms of pyrolysis that use microwave technology. Many other approaches have been taken to address the growing problem of waste tires in a cost effective and environmentally friendly way. However, a need exists to improve waste tire processing in this technology field.

SUMMARY

In some approaches, the ultrasonic microwave molecular vacuum distillation system utilizes distillation to return whole waste tires to usable substances. The system can process these tires completely and more efficiently via the ultrasonic microwave molecular vacuum distillation. The system can further control this distillation process with no harmful emissions.

In other approaches, the system includes an apparatus for tire distillation. The system includes an ultrasonic purge chamber and a microwave radiation chamber. The ultrasonic purge chamber includes a purge gas device and a transducer array. The purge gas device purges gasses from a pre-heated tire. The transducer array ultrasounds the tire. The microwave radiation chamber includes a plurality of magnetrons and a plurality of transducer arrays. The plurality of magnetrons microwave the tire. The plurality of transducer arrays ultrasound the tire.

In some approaches, the system processes tires for distillation. The process includes purging gasses from a pre-heated tire and ultrasounding a tire. The process further includes microwaving and ultrasounding the tire.

In other approaches, the system distills the tires by the following system and/or process as generally described herein. The system applies ultrasonic waves (e.g., high frequency ultrasonic waves, high power ultrasonic waves, etc.) to the tire at a high pressure. The system applies microwave power (e.g., high frequency, low frequency, high wavelength, high power, etc.) to the tire at a low pressure. This system and/or process can occur in any order, e.g., ultrasonic waves then microwave power; microwave power then ultrasonic waves; ultrasonic waves, microwave power, and then ultrasonic waves; etc. The pressures utilized in this system and/or process can be low/high relative to each other and/or relative to atmospheric pressure. An advantage of this system and/or process is that the tires can be distilled utilizing less energy. For example, water boils at 212°, but in a vacuum of −14 psig water boils at about 86° F., requiring less energy. Another advantage of this system and/or process is that by fluctuating bombardment with ultrasonic waves and the microwave power, the stronger sulfur bonds in the tire are weakened easing the separation of hydrocarbon gases.

In some approaches, the system includes a vacuum, a compressor, and/or a generator. The vacuum can ensure proper movement of the separated gases. The vacuum can be placed between the main chamber and the condenser that allows the fuel oil to be condensed from the gaseous state. The other natural gases are then compressed by the compressor and fed to the generator. The compressor that feeds the generator can advantageously use less energy because the vacuum (e.g., a vacuum pump) is creating pressure on the back side of the system.

In other approaches, the system includes a preheating chamber, a main chamber, an ultrasonic purge chamber, and/or a steam chamber. The preheating chamber uses waste heat from the main chamber to bring the tires to roughly 225-250° F. before the tires are dropped into the ultrasonic purge chamber. Surplus waste heat is also used to generate steam for the steam chamber. A check valve in the purge chamber insures that the purge with $CO^2$ releases the lighter gases. Upon completion of the purge, the first series of ultrasonic waves are used to begin the distillation in the ultrasonic purge chamber, using high powered transducers tuned to a set frequency (e.g., 20+− KHz, 30+− KHz, etc.) for a measured period of time (e.g., thirty seconds, two minutes, etc.). As the doors to the purge chamber open releasing the vacuum, the previously loaded tire is bombarded with a second series of ultrasonic waves. When the purge chamber doors close, the chamber is filled with high power microwaves.

In some approaches, the system includes handling devices to guide the tires through the system. The handling devices can include ceramic L hooks in conjunction with a ceramic conveyor and ceramic guide rails to keep the tire vertical while processing. Other types of handling devices can be utilized for the guiding of the tires through the system. As the tire disintegrates, the hooks act to keep the steel from falling into a bunch and creating an arc. The tires are moved along the conveyor belt. As the tires disintegrate hydrocarbon gases and vaporized fuel oil are removed through the vacuum ports at the top of the chamber. The remaining substances are steel and carbon black. Although the microwaves should not do much heating to the steel, the steel absorbs the surrounding heat. Using this absorbed heat to maintain temperature, the steel and carbon black are dropped into the activation chamber. When the chamber seals, high pressure steam is forced into the chamber for a period of time to activate the carbon. The steam also purges the gases from this chamber. The steel and carbon are then released through a chute and separated by two conveyors. The magnetic upper conveyor removes the steel from the activated carbon.

In other approaches, the microwaves are controlled by the magnetron assemblies using bi-directional waveguides and dual stirrer boxes with multiple magnetrons. The multiple magnetrons enables pulsating power to alternate between the magnetrons to reduce the chance of arcing.

The system and/or processes of this technology utilizes a unique combination of technologies to form an effective distillation procedure that addresses the strength of sulfur bonds and the volatility of hydrocarbons. Furthermore, the system uses low pressure so that less heat, i.e., less energy, is needed to sustain the distillation process. In addition, the system combines ultrasonic waves with higher pressure to continue the distillation process.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the technology, as well as the technology itself, will be more fully understood from the following description of various embodiments, when read together with the accompanying drawings.

FIG. 1 illustrates the path of the tires as the tires are processed via the system. The system includes a power distribution/modulator (3), a steam compressor pump (5), a fuel oil condenser (9), a fuel oil receiver tube (20), a vacuum pump, a waste heat boiler, a waste heat recovery boiler (6), an ad-power low heat turbine (7), a natural gas compressor (8), a natural gas generator, a high pressure steam line (12), a ceramic hook conveyer (15), and a steam compression system.

FIG. 5 further illustrates the reception doors of the purge ultrasonic chamber. The pre-heat chamber utilizes conventional conveyors and guide rails. The exhaust port (not shown) is for maintaining tire temperatures of 225-250° F.

The following numbers and corresponding key provide a general guide to FIGS. 1-6. However, the detailed description of the FIGS. 1-6 includes additional details regarding the parts for each component of the system.

1=Sweep-through Purge Chamber
2=Steam Activation Chamber
3=Power Distribution/Modulator
4=Pre-Heat Chamber
5=Steam Compression Pump
6=Waste Heat Recovery Boiler
7=Ad-Power Low Heat Turbine
8=Natural Gas Compressor
9=Fuel Oil Condenser
10=Vacuum Pump
11=Waste Heat Exhaust
12=High Pressure Steam
13=Purge Gas/Ultrasonic Chamber
14=Purge Gas Input Valve
15=Ceramic Hook Conveyor
16=Pre-Heat Conveyor
17=Pre-Heater Drop Slot/Doors
18=Separation Conveyor
19=Natural Gas Generator
20=Fuel Oil Receiver Tube
21=Magnetic Conveyor
22=Conveyor Belt
23=Magnetron Assembly
24=Fuel Oil Check Valves
25=Ultrasound Transducer
26=Transducer Array
27=Steel Tire Rail
28=Ceramic Tire Rail
29=Ceramic L hooks
30=Purge Gas Release Valve
31=Ultrasonic Chamber Entry Doors
32=Ultrasonic Chamber Exit Doors
33=Pneumatic Door Control
34=Ultrasonic Chamber Launcher
35=Steam Chamber Reception Area
36=Activation Chamber Entry Doors
37=Ceramic Microwave Window
38=Magnetron Antennae
39=Microwave Stirrer Box
40=Microwave Stirrer Fan
41=Wave Guide
42=Stub Tuner
43=Magnetron
44=Steam Pressure Relief Valve
45=Steam Pressure Gauge
46=Activation Chamber Exit Doors
47=Activated Carbon & Steel Shute
48=Auto/Small Truck up to 16.5 Inch Tire
51=Main Microwave Radiation Chamber
53=Motor

DETAILED DESCRIPTION

This technology relates to a system for distilling waste tires. The system can utilize a combination of microwaves and ultrasonic waves with controlled atmospheric fluctuations to distill the tires. The ultrasound is used under a gas pressure purge to clear the chamber of combustible gases and to begin the breakdown of the sulfur bonds. The system then moves the waste tire to the vacuum chamber where the reduced pressure makes lower temperatures necessary for further breakdown of the tire. At each instance of a tire entering the chamber, a fluctuation in pressure will occur. To continue the breakdown further, the system is synchronized to bombard the tire with ultrasonic waves at the moment of pressure fluctuation.

Figure 1:
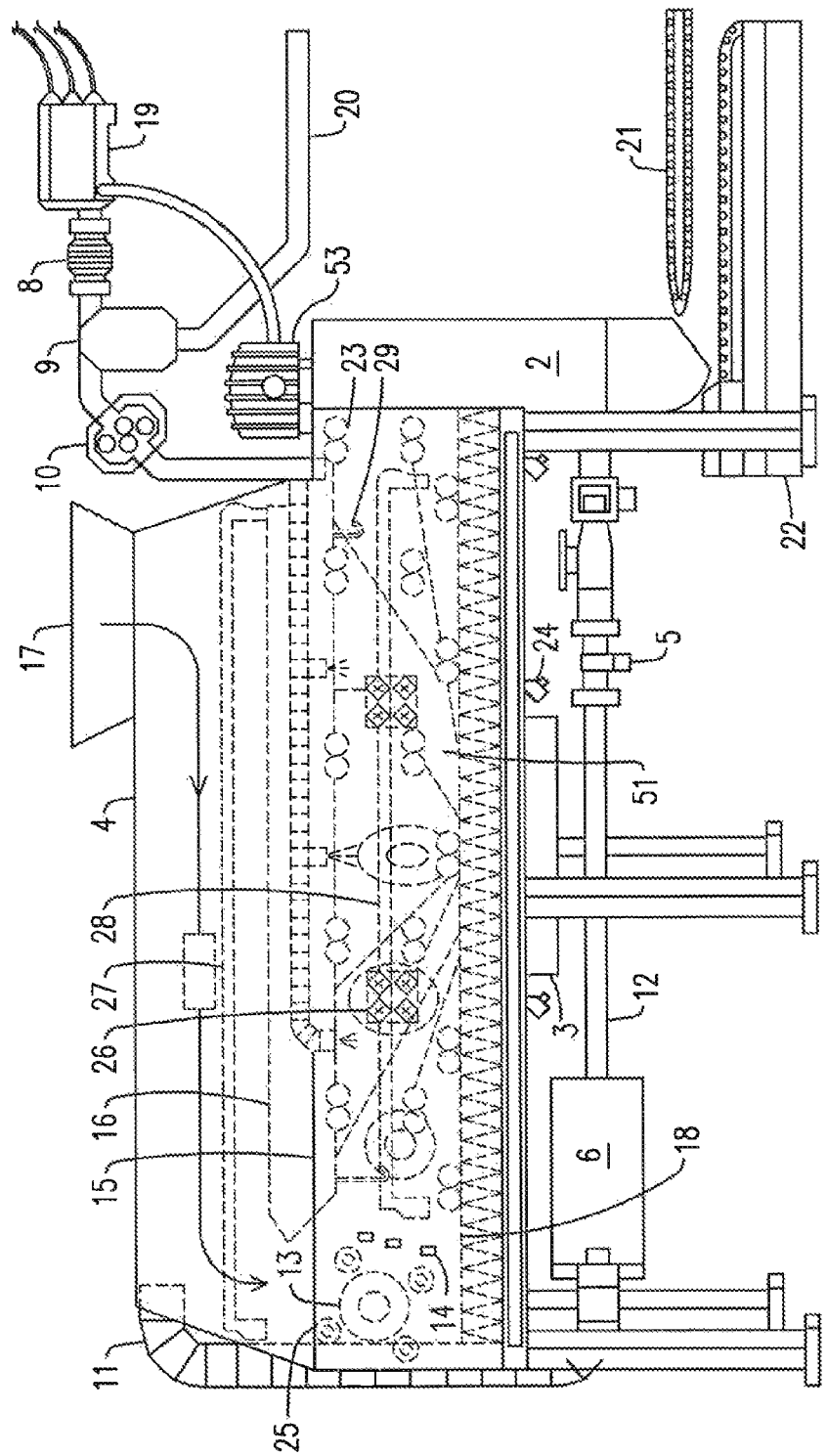
FIG. 1. illustrates a side view of an exemplary system, using translucent sidewalls to expose the inner mechanisms.
Figure 2:
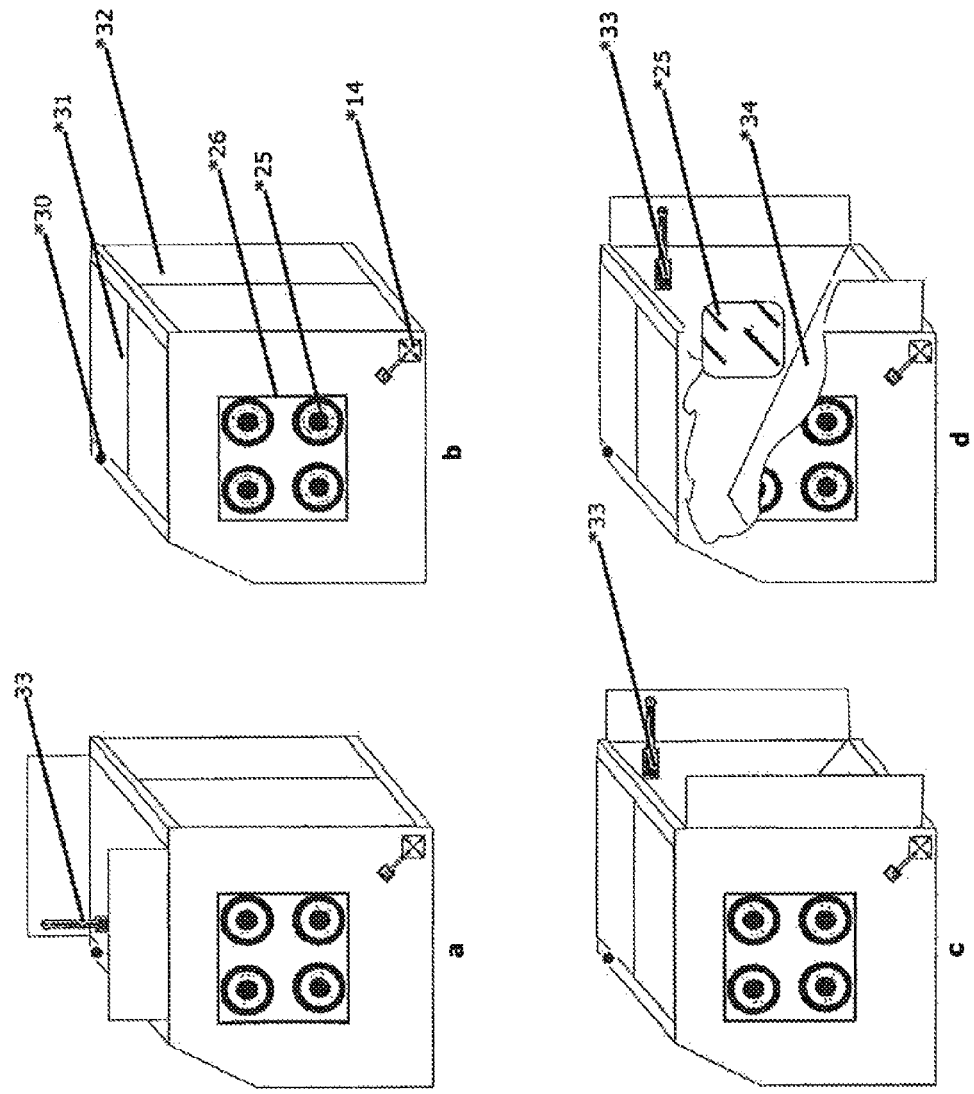
FIG. 2a illustrates an exemplary ultrasonic purge chamber with reception doors open and ready for loading of a pre-heated tire.
FIG. 2b illustrates the exemplary ultrasonic purge chamber with all doors closed. In this state, a pressure purge and a first series of ultrasonic waves are applied to a tire in the ultrasonic purge chamber.
FIG. 2c illustrates the exemplary ultrasonic purge chamber with expulsion doors open and a launcher plate in a launched position. In this state, the tire is fed onto the ceramic belt and ceramic L hooks to a main chamber.
FIG. 2d illustrates a cutaway of the exemplary ultrasonic purge chamber. In this cutaway, the transducer array, the pneumatic door control, and the launch plate is illustrated.

FIG. 1. illustrates a side view of an exemplary system. With reference to FIG. 1, the tire to be processed is placed in the pre-heater reception doors (17). These spring-operated doors can be made of thin steel and can be used to keep heat in while guiding the tire onto the pre-heater conveyor (16). The tire is held vertical by the steel guide rails (27) within the chamber. The tire is moved along by the conveyor (16), while excess heat is removed through the waste heat exhaust (11). The pre-heated tire is dropped into the ultrasonic purge gas chamber (13) while in reception mode as illustrated in FIGS. 2a-2d. The reception doors (31) of FIG. 2B then close by pneumatic door control (33), sealing the chamber. Once the chamber is sealed as shown in FIG. 2B, $CO^2$ gas is forced into the purge gas input valve (14), oxygen and light gases are forced out via the purge relief valve (30), and the transducers (25) in the transducer array (26) are activated. This begins the distillation process.

Figure 3:
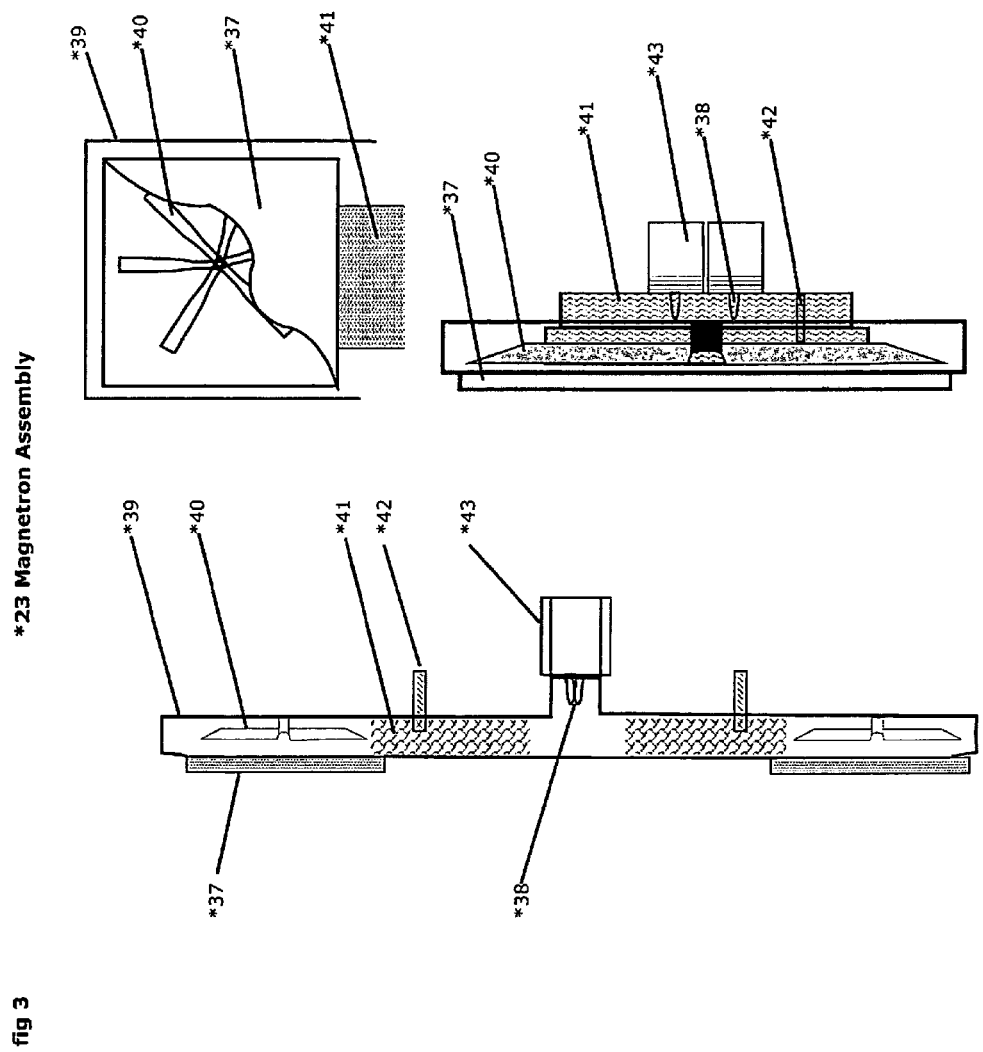
FIG. 3 illustrates an exemplary magnetron assembly from three different views. In some examples, the system utilizes the bi-directional wave guide with two magnetrons and two stirrer boxes. The magnetron assembly includes a magnetron antennae (38), a microwave stirrer box (39), a microwave stirrer fan (40), a wave guide (41), and a stub tuner (42).
Figure 4:
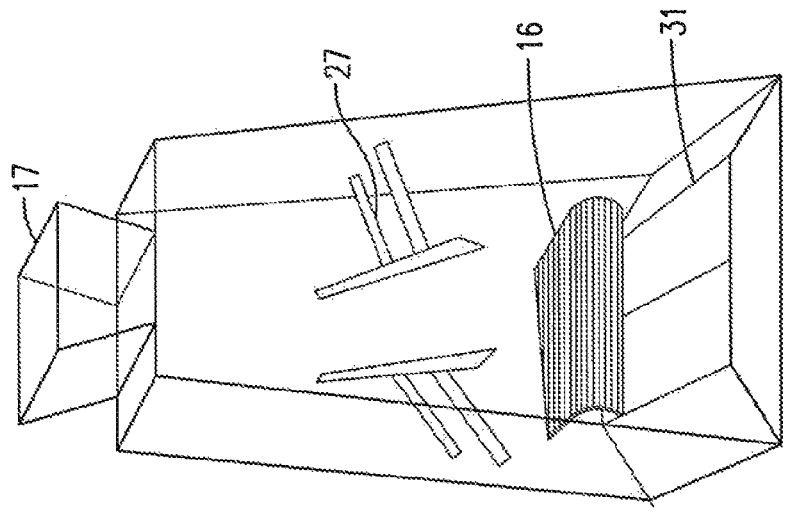
FIG. 4 illustrates an exemplary steam activation chamber in an activation state. The reception door and the exit door of the steam activation chamber are both closed. In this state, the cavity of the steam activation chamber is pressurized with steam which activates the carbon black. The steam activation chamber includes a steam pressure relief valve (44), a steam pressure gauge (45), and a activated carbon and steel shute (47).
Figure 5:
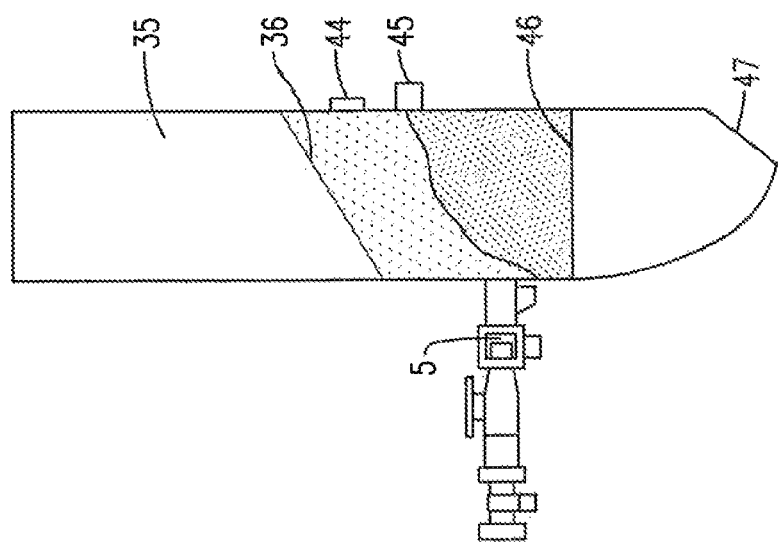
FIG. 5 illustrates a cross section of an exemplary pre-heat chamber. The pre-heat chamber is empty.
Figure 6:
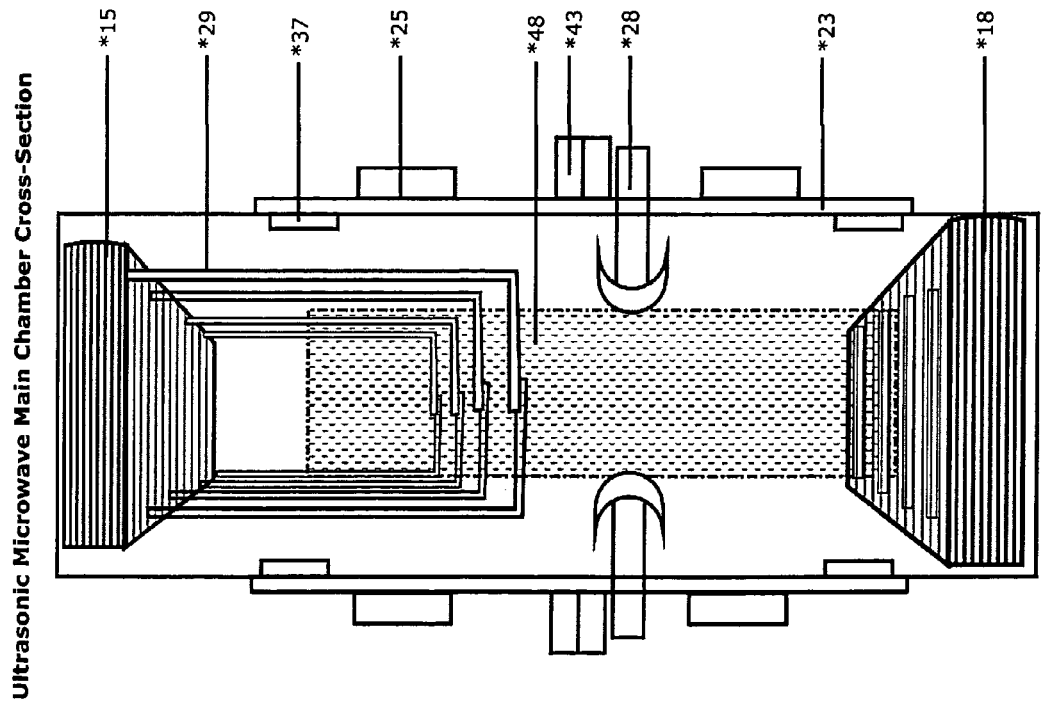
FIG. 6 illustrates a cross section of an exemplary main chamber. The main chamber includes a ceramic guide rail, a ceramic microwave windows (37), a ceramic L hook, and a ceramic conveyor (18). The main chamber further includes a magnetron assembly (23), magnetrons, and an ultrasonic transducer array. A translucent image depicting the average sized tire (48) is also shown in FIG. 6.

When the ultrasonic purge gas chamber exit doors (32) are opened, the launch plate (34) is lifted pushing the tire to the main chamber as shown in FIG. 6. The tire is moved by the ceramic L hooks (29) working in conjunction with the ceramic conveyor (18). The tire is held upright by the L hooks (29) working together with the ceramic guide rails (28). Immediately, the pneumatic exit doors (32) are sealed. At this time the magnetrons (43) of FIG. 3 are energized and microwave energy fills the main chamber. When the purge chamber exit doors (32) open again to allow the next tire into the main chamber, the magnetrons are shut off and the main chamber transducers (25) are energized, filling the chamber with ultrasonic waves. The tire distill and the vacuum pump (10) remove all vapors from the chamber.

As shown in FIG. 1, fuel oil check valves (24) are located at the bottom of the chamber to allow for the removal of any fuel oil that condenses within the chamber. The solid material from the distillation is moved along the ceramic conveyor (18) to the activation chamber (2) reception area (35) of FIG. 4. When a specific amount of solid material is accumulated, the activation chamber reception door (36) is opened and the solid material falls into the activation chamber (2). When the activation process is complete, the activation chamber release door (46) opens. The solid material escapes through the activated carbon and steel release chute. As shown in FIG. 1, two conveyors (21) and (22) separate the solids. The conveyor (21) is magnetized and pulls the steel from the activated carbon.

The technology is believed to be described above in sufficient detail to allow the appropriate engineers to construct the system. An example of a typical 20-lb waste tire being processed is described below.

For example, the system processes the standard tire in about 12 minutes. The pre-heating chamber accounts for about 5 minutes of the time. Once the tire is dropped into the ultrasonic purge chamber, the purge gas is forced in for approximately 4 seconds. The tire is exposed to 40 seconds of ultrasonic waves generated by 8 transducers using 4 kW each (i.e., 0.35 kW), after which the tire is placed into the main microwave radiation chamber 51. The tire is exposed to high levels of microwaves for approximately two minutes; 6 magnetrons at 6 kW each (i.e., 1.2 kW). Again the exit doors open and the transducers energize for approximately 20 seconds (i.e., 0.175 kW). The process repeats: two minutes of microwave (i.e., 1.2 kW) and another 20 seconds of ultrasound (i.e., 0.175 kW); the final process of 2.5 minutes of higher intensity microwave (i.e., 1.5 kW) completes the process. The finished distillation yields 0.8 US gallons fuel oil, 7.5 lbs activated carbon, 2.5 lbs of steel, and 2.5 cubic feet of natural gas per tire.

Although FIG. 1 illustrates a sequence of microwave and ultrasound, the microwave and ultrasound of the system and/or processes can occur in any sequence. The microwave and/or the ultrasound can be activated in different cycles and/or in different sequences (e.g., cycles and sequences of time, power and/or frequency, etc.) depending on type of tire and/or the type of waste products that are desired from the tire.

The Apparatus includes Infinite Earth Proprietary Quartz window transitions (FIG. 7). This transition includes a specific design that allows the gases being produced to be periodically blown back against the quartz window, clearing smoke and/or debris. This method also cools the windows for longer life.

The Apparatus employs the use of a unique three-tiered belt system (FIG. 8) where the material moving through the system will be in contact with each tier.

The first tier of the belt system is encased within a microwave chamber made of chain mail that directs the energy into a condensed area, thus increasing penetration and absorption; using a chamber within a chamber while maintaining atmospheric equilibrium.

The second tier is an out gas tier where the material will continue to absorb recycled heat and continue to distill and produce more gases.

The third tier is a cooling tier where the heat rises off the material cooling to be absorbed by tier 2. This allows the material to cool to a manageable temperature before being spilled into the exit gate system.

The three-tiered system is designed to handle and operate on a continuous feed system. Coupled with the vacuum and triple gate systems this will maintain continuous feed while under continuous vacuum.

Comprise, include and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein. Scope of the technology is thus indicated by the appended claims, rather than by the foregoing description, and all changes that come within the meaning and range of equivalency of the claims are therefore intended to be embraced therein.

UNIQUENESS OF THE INVENTION

The apparatus includes two components which make this invention unique and patent-worthy:

Continuous feed: the apparatus employs a continuous feed system of conveyor belts that allows the operator to feed the waste feedstock into the machine on a continuous basis. This keeps the machine from stopping and starting which reduces wear and tear on those parts. It also produces more energy instead of losing energy every time the machine is stopped and the door opened to insert more feedstock.

Ceramic Window Cleaner and Defogger: This component was developed to solve a problem. When the apparatus is running, the windows cloud up with fuel oil and other detritus and the operator is unable to see inside to maintain operation. This component directs a constant spray of gas produced in the process back toward the windows to keep them clean and the operator visually unimpaired.

The above two components are essential to the smooth and efficient operation of the apparatus and to the uniqueness of the invention. They set this invention apart from all other similar machines by increasing efficiency, production and ease of operation. None of these components exist in any competitive machines described by either this patent or the US Patent Office, and the degree of uniqueness obtained by these additions is claimed by the inventor to be sufficient to set it apart as a claim worthy of patentability.

Competitors: Hong and Wallace were mentioned in the initial non-final refusal by the USPTO. Both Hong and Wallace designed a machine similar to a microwave oven. The door is opened and waste feedstock is inserted. This is not a unique design, nor is it similar enough to the apparatus to find grounds for denial of the patent.

What is claimed is:

1. A method for tire distillation, comprising:
   preheating a tire during conveyance through an upper chamber from heat produced by a microwave radiation chamber prior to the tire reaching an ultrasonic purge chamber and the microwave radiation chamber;
   radiating the tire located within the ultrasonic purge chamber with ultrasonic radiation;
   radiating the tire within the microwave radiation chamber with microwave radiation;
   transporting the tire from the ultrasonic purge chamber through the microwave radiation chamber with a conveyor with the ultrasonic purge chamber and the microwave radiation chamber are separate chambers; and
   maintaining an atmosphere in the ultrasonic purge chamber and the microwave radiation chamber under a vacuum.

2. A system for tire distillation, comprising:
   an upper chamber;
   a first conveyor configured to transport a tire through the upper chamber;
   a lower chamber located beneath the upper chamber, the lower chamber comprising:
      an ultrasonic purge chamber configured to radiate the tire with ultrasonic radiation;
      a microwave radiation chamber configured to radiate the tire with microwave radiation; and
      a second conveyor configured to transport the tire from the ultrasonic purge chamber through the microwave radiation chamber; and
   a vacuum system configured to maintain an atmosphere in the ultrasonic purge chamber and the microwave radiation chamber under a vacuum;
   wherein the tire is preheated during conveyance through the upper chamber from heat produced in the lower chamber.

3. The apparatus of claim 2, wherein the microwave radiation chamber further comprises doors for isolating the atmosphere within the microwave radiation chamber.

4. The apparatus of claim 2, wherein the microwave radiation chamber further comprises at least one magnetron.

5. The apparatus of claim 4, wherein the microwave radiation chamber further comprises at least one ultrasonic transducer.

6. The apparatus of claim 2, wherein the ultrasonic purge chamber further comprises at least one transducer.

7. The apparatus of claim 2, wherein the vacuum system is further configured to remove tire distillation gases being expelled from the microwave radiation chamber.

8. The apparatus of claim 2, further comprising at least one fuel oil check valve located within the microwave radiation chamber to remove condensed fuel oil from within the microwave radiation chamber.

9. The apparatus of claim 2, further comprising an activation chamber configured to receive a solid material of a time that is distilled from the microwave radiation chamber.

10. The apparatus of claim 9, further comprising a magnetized third conveyor configured to transport metallic material from the activation chamber.

11. The apparatus of claim 10, further comprising a fourth conveyor configured to transport non-metallic material from the activation chamber.

12. The apparatus of claim 2, wherein the second conveyor further comprises at least one hook configured to hold at least one tire.

13. The apparatus of claim 12, wherein the at least one hook is configured to prohibit a metallic material of a tire from creating an arc as the tire disintegrates.

* * * * *